United States Patent [19]

Kawaguchi

[11] 3,957,941

[45] May 18, 1976

[54] PROCESS FOR PREPARING SHAPED ARTICLE

[75] Inventor: Hideaki Kawaguchi, Toyonaka, Japan

[73] Assignee: Nippon Gohsei Kagaku Kogyo Kabushiki Kaisha, Osaka, Japan

[22] Filed: May 22, 1974

[21] Appl. No.: 472,482

[52] U.S. Cl. .............. 264/234; 260/29.6 B; 264/185; 264/235; 264/331; 264/343; 264/345
[51] Int. Cl.² .................. B29C 25/00; B29D 7/20
[58] Field of Search ............... 264/232–234, 264/343, 345, 235, 331, 185, 178 R; 260/29.6 B, 29.6 H

[56] References Cited
UNITED STATES PATENTS

| | | | |
|---|---|---|---|
| 3,220,992 | 11/1965 | Smyser et al. | 260/29.6 B |
| 3,352,960 | 11/1967 | McLaughlin | 264/343 |
| 3,419,654 | 12/1968 | Chiba et al. | 264/345 |

OTHER PUBLICATIONS

Davidson–Sittig, "Water–Soluable Resins", Reinhold Book Corp., 1968, p. 126.

Primary Examiner—Jeffery R. Thurlow
Attorney, Agent, or Firm—Armstrong, Nikaido & Wegner

[57] ABSTRACT

A process for preparing a shaped article made of hydrolyzed ethylene-vinyl acetate copolymer having an improved impact resistance by conditioning the shaped article to contain water within the range of 0.2 to 3.0 % by weight to the article. The impact resistance of the shaped article can be improved without losing the advantageous characteristics of the copolymer and the improved article can be suitably employed as engineering plastics.

5 Claims, No Drawings

PROCESS FOR PREPARING SHAPED ARTICLE

BACKGROUND OF THE INVENTION

The present invention relates to a process for improving an impact resistance of a shaped article made of hydrolyzed ethylene-vinyl acetate copolymer.

The hydrolyzed ethylene-vinyl acetate copolymer has been used as film, sheet or fiber, but the copolymer has not been employed as yet in the field of the so-called engineering plastics, for instance, electric-device parts such as knob or cabinet or machine parts such as pulley, roller, bar, gear, cam, bobbin or housing, e.g. switch cover, motor cover or transformer cover.

A shaped article made of the hydrolyzed ethylene-vinyl acetate copolymer is excellent in oil resistance, and also far superior in the properties of hardness, tensile strength, flexural strength and compression strength to known thermoplastics, but inferior in impact resistance.

Therefore, such a shaped article has not been employed in the field of an engineering plastics to which high impact strength is often applied.

When a shaped article made of the copolymer is used for an engineering plastics, crack and breakdown often occur, especially in a short period of time after molding.

OBJECTS OF THE INVENTION

It is an object of the present invention to provide a shaped article made of hydrolyzed ethylene-vinyl acetate copolymer having an improved impact resistance.

A further object of the invention is to provide a process for improving an impact resistance of a shaped article made of hydrolyzed ehtylene-vinyl acetate copolymer.

A still further object of the invention is to provide a shaped article made of hydrolyed ethylene-vinyl acetate copolymer capable of employing as engineering plastics.

These and other objects of the invention will become apparent from the description hereinafter.

DETAILED DESCRIPTION

It has now been found that an impact resistance of a shaped article made of hydrolyzed ethylene-vinyl acetate copolymer is closely related with a water content thereof and the impact resistance can be improved without losing the advantageous characteristics of the hydrolyzed ethylene-vinyl acetate copolymer by adjusting the water content within the specific range after molding the copolymer.

The shaped article so treated exhibits the excellent impact resistance in addition to other advantageous characteristics of the copolymer, such as oil resistance, hardness, flexural strength and flexural modulus, and can be suitably employed as engineering plastics.

The hydrolyzed ethylene-vinyl acetate copolymer is generally prepared by polymerizing ethylene and vinyl acetate and then hydrolyzing the obtained copolymer with a catalyst, such as sodium hydroxide or sodium methylate. The hydrolyzed ethylene-vinyl acetate copolymers suitable for shaped articles are those having an ethylene content of 15 to 60 % by mole, preferably of 20 to 50 % by mole, and having a vinyl acetate content of 85 to 40 % by mole, preferably of 80 to 30 % by mole, and having a degree of hydrolysis in the vinyl acetate component of not less than 85 % by mole, preferably of not less than 98 % by mole. No more than 5 % by mole in vinyl acetate component of the copolymer may be replaced by another copolymerizable monomer, such as propylene, crotonic acid, acrylic acid, methacrylic acid, maleic acid and alkyl ester thereof. Hydrolyzed ethylene-vinyl acetate copolymers outside the above-mentioned range either on ethylene content or the degree of hydrolysis are not suitable for a shaped article since a shaped article prepared from such a copolymer is inferior in mechanical strength, solvent resistance, creep resistance, hardness, surface smoothness and abrasion resistance.

The hydrolyzed ethylene-vinyl acetate copolymer having the specific composition as mentioned above is molded to the desired shape by means of usual manner such as injection molding, extrusion, blow molding, compression molding, rotational molding, casting, or calendering. In carrying out the molding, known additives such as stabilizer, plasticizer, filler, coloring agent, foaming agent and surface active agent may be blended with the copolymer.

The molding is generally carried out after drying the copolymer to the extent of 0.05 to 0.2 % by weight in the water content, usually 0.07 to 0.15 % by weight. When the copolymer containing a large amount of water is molded, water vaporizes during molding and many foams are contained in the obtained article. Therefore, thus shaped article usually has the water content of about 0.07 to 0.15 % by weight. As stated before, such a shaped article is inferior in impact resistance.

According to the present invention, it is essential that the shaped article made of hydrolyzed ethylene-vinyl acetate copolymer contains water within the range of 0.2 to 3.0 % by weight, preferably 0.5 to 2.0 % by weight, to the article. After molding the hydrolyzed ethylene-vinyl acetate copolymer having the specific composition by a known process, the shaped article is contacted with an aqueous atmosphere to adjust the water content within the above range. The shaped article made of hydrolyzed ethylene-vinyl acetate has a tendency to absorb the water from the atomosphere, and the rate of absorbing depends on the humidity, the thickness of the article, and the composition of the copolymer. For instance, when the board having a thickness of ⅛ inch is allowed to stand for 80 days in contact with the atmosphere at a temperature of 20°C. and a relative humidity of 60 %, the water content thereof reaches to the extent of 0.15 % by weight. And when the board having a thickness of ¼ inch is allowed to stand for 200 days in contact with the atmosphere under the same condition as in the above, the water content thereof reaches to the extent of 0.10 % by weight. Therefore, it is not considered practically to make the water content reach to the required in the present invention by allowing the article to stand in the atmosphere.

For the purpose of improving the impact resistance of the article, the article should be contacted with water by the following means for conditioning, although it is not intended to limit to those means. The conditioning of the shaped article is carried out by a means of allowing to stand the shaped article under circumstances containing steam abundantly for a certain period, or spraying water or steam to the shaped article, or dipping the shaped article in water. In either case, it is possible to employ a mixture of water with an inorganic salt such as sodium sulfate, sodium carbonate, magnesium chloride or sodium chloride, or a mixture of water and a solvent such as methanol, ethanol, isopropanol, formic acid, acetic acid or phenol, not to mention water alone. Also, a temperature of water or vapor is not specifically limited. Usually, it is practical to allow to stand the shaped article under circumstances at a temperature of 40° to 90°C. and a relative humidity of 70 to 100 %. Though a period required in treatment depends on a shape of the article and a composition of the copolymer, it is usually selected from the range of 2 hours to 2 days. Furthermore, in case of dipping the shaped article in hot water at a temperature of 40° to 90°C., the conditioning can be carried out for a shorter period.

hours (Example 1), at a temperature of 40°C. for 4 hours (Example 2), at a temperature of 80°C. for 1.5 hours (Example 3) and at a temperature of 80°C. for 3 hours (Example 4), respectively. After taken out of water, the pieces were allowed to stand in contact with the atmosphere of 2 days. The remaining one group was allowed to stand in the atmosphere for 2 days without dipping in water (Comparative Example 1). And the last one group was dipped in water at a temperature of 80°C. for 5 hours (Comparative Example 2).

The physical properties of thus treated pieces were measured. The results thereof were shown in Table 1 in which the values were represented by the average of ten pieces.

Table 1

|  | Water content | Impact strength | Tensile strength | Flexural strength | Flexural modulus | Elongation | Dimensional stability |
|---|---|---|---|---|---|---|---|
|  | % | kg.cm./cm. | kg./cm.$^2$ | kg./cm.$^2$ | kg./cm.$^2$ | % | % |
| Ex. 1 | 0.3 | 3.1 | 915 | 1340 | 47000 | 40 | 0.02 |
| Ex. 2 | 0.9 | 5.4 | 900 | 1300 | 46500 | 85 | 0.09 |
| Ex. 3 | 1.6 | 8.8 | 885 | 1240 | 45800 | 130 | 0.15 |
| Ex. 4 | 2.7 | 12.3 | 830 | 1180 | 45000 | 200 | 0.45 |
| Com. Ex. 1 | 0.15 | 1.9 | 920 | 1350 | 47000 | 35 | 0.01 |
| Com. Ex. 2 | 3.9 | 19.0 | 710 | 890 | 39000 | 280 | 1.01 |

By such a means, the water content of the shaped article is controlled within the range of 0.2 to 3.0 % by weight. When the water content is less than 0.2 % by weight, the impact resistance can not be improved. On the other hand, when the water content is higher than 3.0 % by weight, the impact resistance increases in proportion to the water content but such an article can not be put to practical use since other properties such as tensile strength, flexural strength and flexural modulus extremely lower and the dimensions remarkably change. Especially, in the above-mentioned range, the range of 0.5 to 2.5 % by weight is more preferably selected to the uses being in need of higher impact strength.

The present invention is more particularly described and explained by means of the following illustrative Examples.

EXAMPLES 1 TO 4

An extruder was charged with powdery hydrolyzed ethylene-vinyl acetate copolymer having an ethylene content of 30 % by mole, a degree of hydrolysis in vinyl acetate component of 99.2 % by mole and water content of 0.15 % by weight. The copolymer was extruded at a temperature of 215°C. to form pellets.

Then, the pellets were provided into an injection molding machine capable of injecting a material in an amount of 3.5 oz.avdp. and the injection molding was carried out to form one hundred of test piece under the following molding conditions; nozzle temperature: 220°C., cylinder temperature at the front part: 230°C., cylinder temperature at the back part: 220°C., mold temperature: 80°C., injection pressure: 1,080 kg/cm.$^2$ and one cycle: 45 sec. The average water content of the test piece after 6 hours from the molding was 0.09 % by weight.

From thus obtained one hundred of test piece, six groups of test piece in which one group consisted of ten pieces were optionally selected. Each of four groups was dipped in water at a temperature of 40°C. for 2

Note:
1. The water content calculated from the weight change of the test piece before and after allowing to stand the test piece in the vacuum chamber at a temperature of 110°C. for 12 hours.
2. The impact strength was Izod impact strength and was measured according to the provision of ASTM D 256. The tensile strength was measured according to the provision of ASTM D 638. The flexural strength and the flexural modulus were measured according to the provision of ASTM D 790.
3. The dimensional stability was calculated from a diametric change of a discoid piece having a thickness of ⅛ inch and a diameter of 4 inches in which a diameter was measured before and after the conditioning by slide calipers with a dial gauge.

EXAMPLES 5 TO 7

The same procedures as in the preceding Examples were repeated to form test pieces except that hydrolyzed ethylene-vinyl acetate copolymer having an ethylene content of 41 % by mole and a degree of hydrolysis in vinyl acetate component of 95.0 % by mole was employed. The average water content of the piece after 6 hours from the molding was 0.07 % by weight.

From one hundred of test piece, four groups of test piece in which one group consisted of ten pieces were optionally selected. Each group was allowed to stand for 24 hours under an atmosphere; (1) temperature: 37°C. and humidity: 83 % RH (Example 5), (2) temperature: 50°C. and humidity: 95 % RH (Example 6) or (3) temperature: 80°C. and humidity: 98 % RH (Example 7), respectively. On the other hand, the remaining one group was allowed to stand in contact with the atmosphere for 4 days without conditioning (Comparative Example 3).

The physical properties of the pieces so treated were measured and the results thereof were shown in Table 2.

Table 2

| | Water content | Impact strength | Tensile strength | Flexural strength | Flexural modulus | Elongation | Dimensional stability |
|---|---|---|---|---|---|---|---|
| | % | kg.cm./cm. | kg./cm.$^2$ | kg./cm.$^2$ | kg./cm.$^2$ | % | % |
| Ex. 5 | 0.6 | 4.6 | 770 | 1050 | 35900 | 140 | less than 0.01 |
| Ex. 6 | 1.4 | 12.0 | 740 | 990 | 35400 | 200 | less than 0.01 |
| Ex. 7 | 2.8 | 18.5 | 680 | 940 | 33900 | 200 | 0.03 |
| Com. Ex. 3 | 0.09 | 2.2 | 790 | 1050 | 36000 | 120 | less than 0.01 |

What is claimed is:

1. A process for preparing a shaped article made of hydrolyzed ethylene-vinyl acetate copolymer having an improved impact resistance, which comprises molding hydrolyzed ethylene-vinyl acetate copolymer having an ethylene content of 15 to 60 % by mole, a vinyl acetate content of 85 to 40 % by mole and a degree of hydrolysis in vinyl acetate component of not less than 85 % by mole, and, subsequent to said molding conditioning the shaped article to contain water within the range of 0.2 to 3.0 % by weight.

2. The process of claim 1, wherein said hydrolyzed ethylene-vinyl acetate copolymer has an ethylene content of 20 to 50 % by mole, a vinyl acetate content of 80 to 50 % by mole and a degree of hydroysis in vinyl acetate component of not less than 98 % by mole.

3. The process of claim 1, wherein said conditioning is carried out to adjust the water content of the shaped article within the range of 0.5 to 2.5 % by weight.

4. The process of claim 1, wherein said conditioning is carried out by allowing to stand the shaped article under a circumstance at a temperature of 40° to 90°C. and a relative humidity of 70 to 100 %.

5. The process of claim 1, wherein said conditioning is carried out by dipping the shaped article in water at a temperature of 40° to 90°C.

* * * * *